(12) United States Patent
Davis et al.

(10) Patent No.: US 7,392,313 B2
(45) Date of Patent: Jun. 24, 2008

(54) METHOD AND APPARATUS FOR PARTITIONED ENVIRONMENT FOR WEB APPLICATION SERVERS

(75) Inventors: Mikey Andrew Davis, Pflugerville, TX (US); Shannon James Kerlick, Cedar Park, TX (US); Jack E. Land, Jr., Cedar Park, TX (US); Dan Jeffrey Mandelstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1316 days.

(21) Appl. No.: 09/981,873

(22) Filed: Oct. 18, 2001

(65) Prior Publication Data

US 2003/0078961 A1  Apr. 24, 2003

(51) Int. Cl.
*G06F 15/173* (2006.01)
*H04L 9/00* (2006.01)
*G06F 7/00* (2006.01)

(52) U.S. Cl. .................. 709/225; 709/217; 709/219; 709/226; 718/1; 718/100; 718/104; 718/106; 719/311; 719/312; 719/313; 719/320; 719/332; 719/328; 719/329; 719/330; 713/161; 713/162; 713/166; 713/182; 713/193

(58) Field of Classification Search ................. 709/203, 709/229, 245; 718/104, 105, 1, 100, 106; 713/121, 171, 161, 162, 166, 182, 193; 717/124, 717/127, 168–171, 174–176; 707/2, 4, 6, 707/10, 203, 204; 370/230; 712/36; 711/100, 711/153, 168, 200, 202, 203, 205–207, 211; 710/18, 23, 37, 100, 107; 706/11; 700/2, 700/9, 26

See application file for complete search history.

(56) References Cited

U.S. PATENT DOCUMENTS

| | | | |
|---|---|---|---|
| 5,410,648 A | 4/1995 | Pazel | 395/158 |
| 5,956,036 A | 9/1999 | Glaser et al. | 345/356 |
| 5,991,878 A * | 11/1999 | McDonough et al. | 726/9 |
| 6,061,517 A | 5/2000 | House et al. | 395/704 |
| 6,167,522 A * | 12/2000 | Lee et al. | 713/201 |
| 6,188,400 B1 * | 2/2001 | House et al. | 715/805 |
| 6,532,488 B1 * | 3/2003 | Ciarlante et al. | 709/205 |
| 6,587,866 B1 * | 7/2003 | Modi et al. | 718/105 |
| 6,697,948 B1 * | 2/2004 | Rabin et al. | 713/200 |
| 6,792,454 B2 * | 9/2004 | Nakano et al. | 709/219 |
| 2001/0047477 A1 * | 11/2001 | Chiang | 713/170 |
| 2002/0032763 A1 * | 3/2002 | Cox et al. | 709/223 |
| 2002/0091639 A1 * | 7/2002 | Mandahl et al. | 705/50 |
| 2002/0143953 A1 * | 10/2002 | Aiken, Jr. | 709/227 |
| 2002/0188435 A1 * | 12/2002 | Labarge | 704/1 |
| 2004/0015950 A1 * | 1/2004 | Dutta et al. | 717/171 |
| 2006/0095526 A1 * | 5/2006 | Levergood et al. | 709/206 |

* cited by examiner

*Primary Examiner*—Ashok B. Patel
(74) *Attorney, Agent, or Firm*—Duke W. Yee; David A. Mims, Jr.; Nam H. Huynh

(57) ABSTRACT

A method, apparatus, and computer instructions for managing access to a set of applications associated with a universal resource locator in a data processing system. A request is received, wherein the request includes the universal resource locator and a user identification. The request is directed to a selected application within the set of applications using the universal resource locator and the user identification.

29 Claims, 3 Drawing Sheets

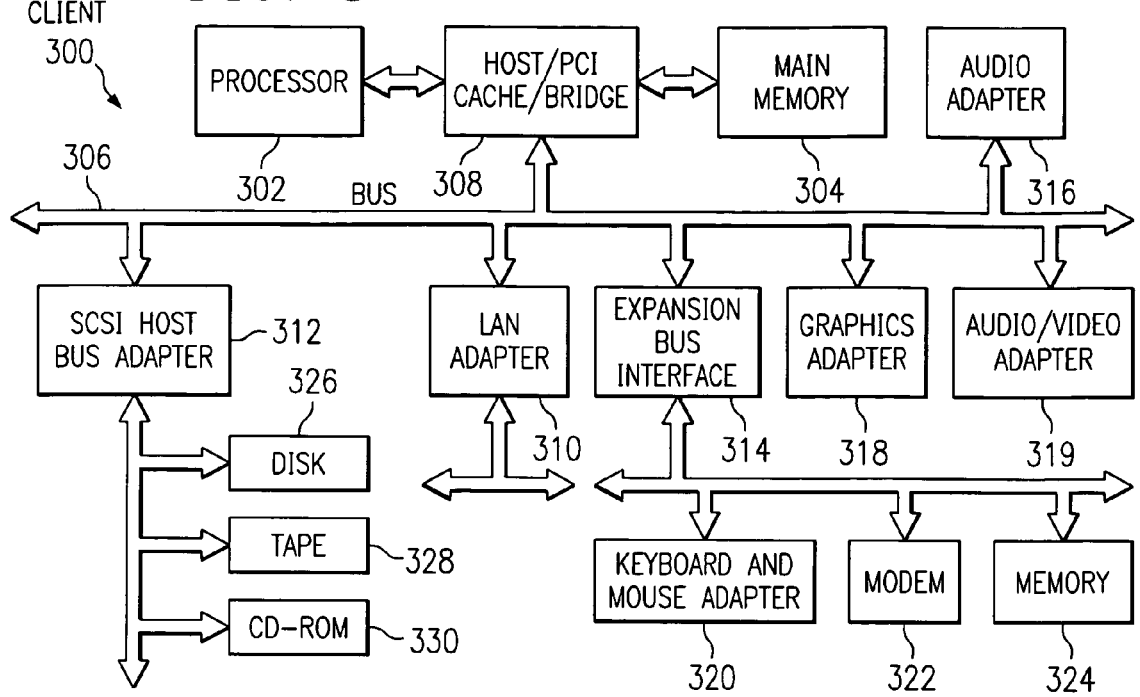
FIG. 3
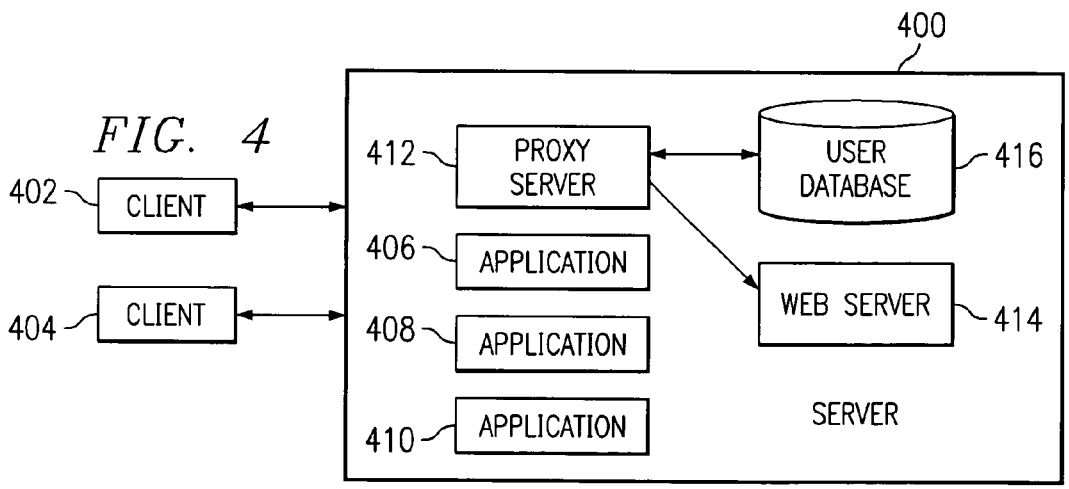
FIG. 4
| 500 { | 4.14.3.1 | IBM.com/develop1/one.exp |
| 502 { | 4.14.3.2 | IBM.com/develop2/one.exp |
| 504 { | STEVE | IBM.com/develop3/one.exp |
FIG. 5

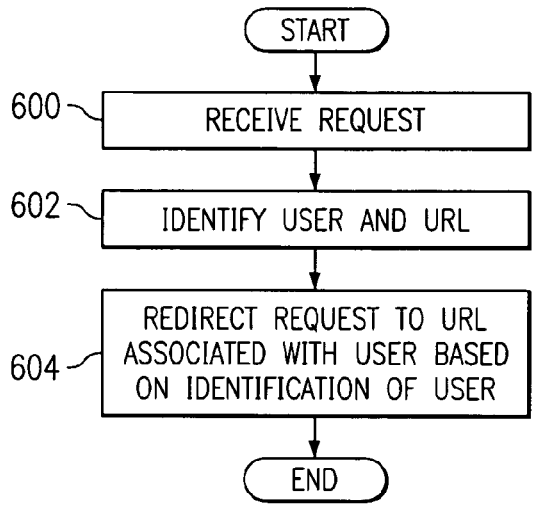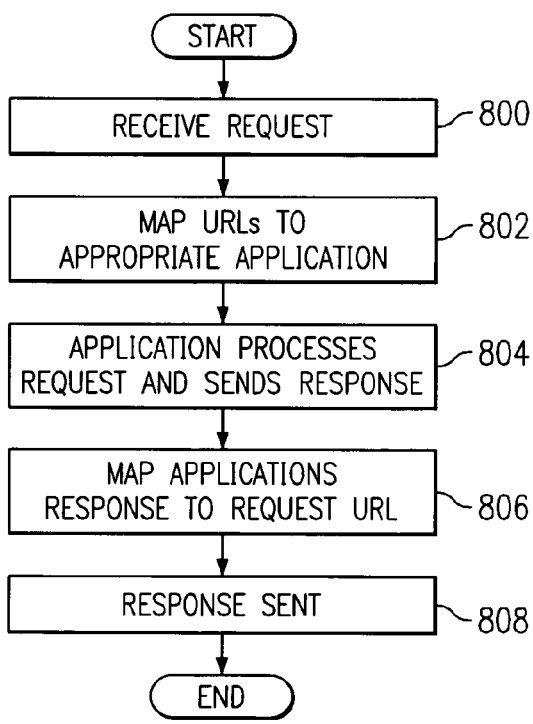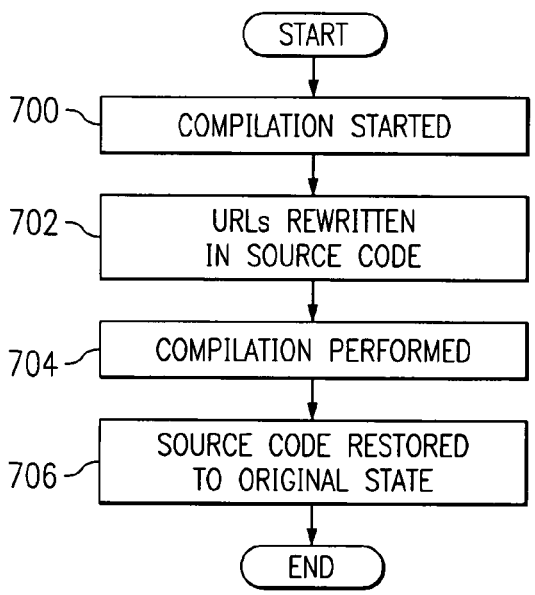

METHOD AND APPARATUS FOR PARTITIONED ENVIRONMENT FOR WEB APPLICATION SERVERS

BACKGROUND OF THE INVENTION

1. Technical Field

The present invention relates generally to an improved data processing system, and in particular to a method and apparatus for managing applications on a server. Still more particularly, the present invention provides a method, apparatus, and computer implemented instructions for accessing applications on server using a universal resource locator.

2. Description of Related Art

The Internet, also referred to as an "internetwork", is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

On the Web, the URL is the key to accessing everything on the Web, including Web sites, files, and applications. One wrong letter or a misplaced punctuation mark can make a difference between a usable and a useless URL for a Web site. For Web site developers one important item for considering during development of a Web site is an identification of the final URLs for that site. Failure to take this identification into consideration may result in frustrated users and unhappy customers.

In Web site development, several developers and analysts may simultaneously work on the actual development of a single Web site. It is important to development applications for the Web site as if they are actually being served up or accessed on the Internet. With the URL issue, the URL used by each developer working on the Web site must be the same if they are working with the same application. Web sites that make use of many different applications and development languages require different skills/expertise from a variety of developers. In order for those developers to use the same URL in their development, they must access the same files on the same host.

Therefore, it would be advantageous to have an improved method, apparatus, and computer instructions for managing development of applications.

SUMMARY OF THE INVENTION

The present invention provides a method, apparatus, and computer instructions for managing access to a set of applications associated with a universal resource locator in a data processing system. A request is received in which the request includes the universal resource locator and a user identification. The request is directed to a selected application within the set of applications using the universal resource locator and the user identification. In these examples, the set of applications is a set of instances of a single application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating components used in accessing applications in accordance with a preferred embodiment of the present invention;

FIG. 5 is a diagram illustrating examples of entries in accordance with a preferred embodiment of the present invention;

FIG. 6 is a flowchart of a process used for accessing a set of applications using the same universal resource locator (URL) in accordance with a preferred embodiment of the present invention;

FIG. 7 is a flowchart of a process used for preprocessing source code in accordance with a preferred embodiment of the present invention; and FIG. 8 is a flowchart of a process used for rewriting URLs for an application in accordance with a preferred embodiment of the present invention

DETAILED DESCRIPTION OF THE PREFERRED EMBODIMENT

Figure 1:
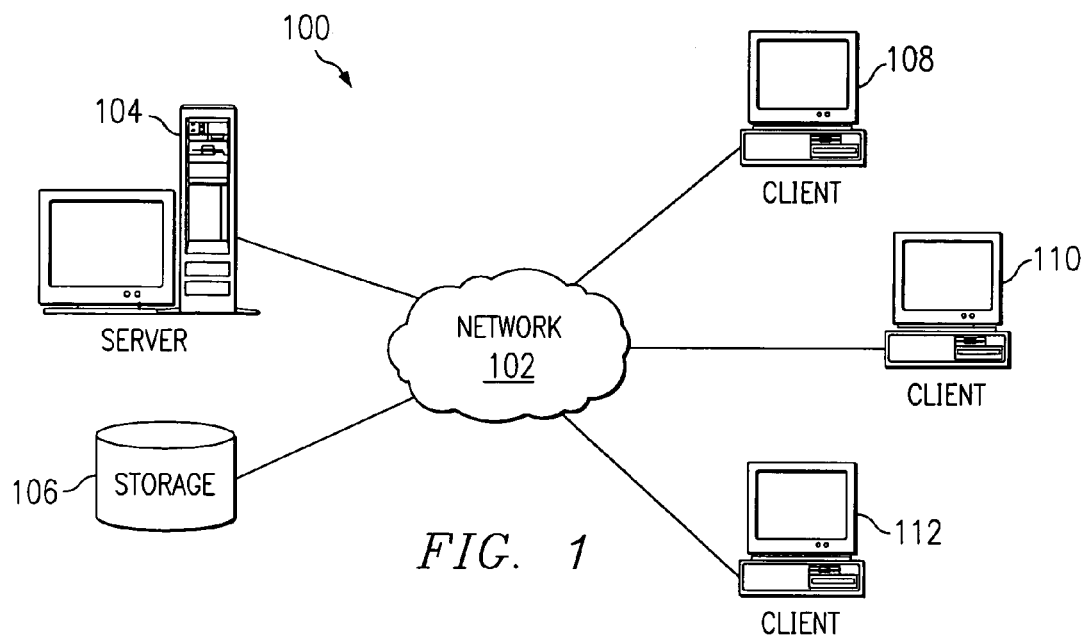
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

The present invention may be implemented within network data processing system 100 to allow for programmers or developers of applications to access a set of applications on a server, such as server 104 through clients, such as 108-112. Specifically, this set of applications is accessed using a single URL. The particular application accessed or served by the server is based on an identification of the user. In these examples, the identification may be based on the IP address of the client or on a user name contained in a request from the client at which the user is located. This mechanism is particularly useful when each programmer or developer is accessing a copy of the application. In other words, the set of applications are instances of a single application. All of these instances are accessed through the same universal resource locator (URL). In this manner, testing of applications using URL may be made using the desired URL by multiple programmers or developers accessing different instances of an application. These processes may be implemented within a proxy located at the server or some other locations, such as a gateway providing access to the server or the clients In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
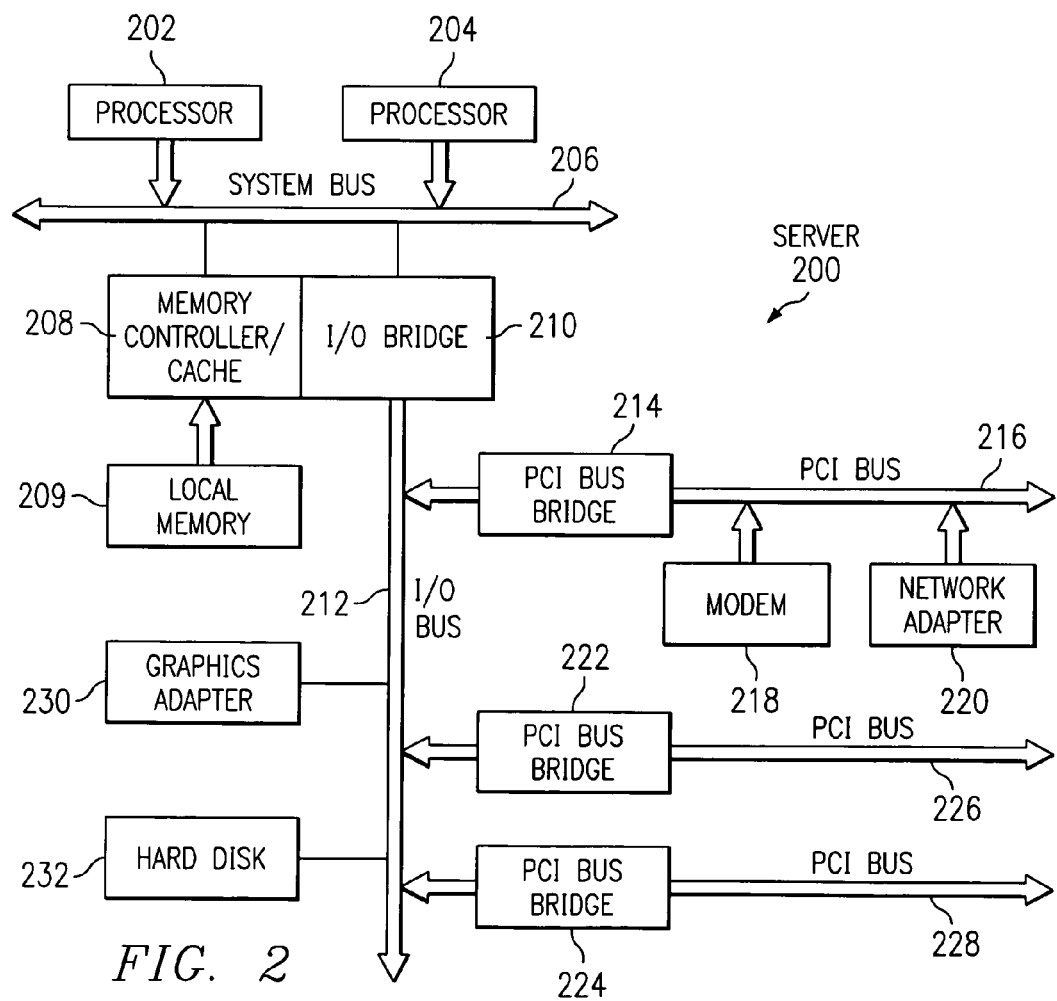
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference now to FIG. 4, a diagram illustrating components used in accessing applications is depicted in accordance with a preferred embodiment of the present invention. In this example, server 400 provides access to clients 402 and 404. Programmers or developers access applications 406, 408, and 410 on server 400. Access to these applications is provided through proxy server 412 on server 400.

The programmers or developers access these applications using the same URL in these examples. Proxy server 412 provides a mechanism for a partitioned development environment also referred to as a "sandbox". Proxy server 412 assigns a copy of the application for each user and dynamically modifies references to a particular instance or copy of the application based on which user is accessing this instance or copy. Proxy server 412 receives requests from clients and provides the appropriate redirection of the request to Web server 414 to provide access to application 406-410.

For example, applications 406-410 are instances or copies of a single application. A first user at client 402 may be assigned application 406, while a second user at client 404 is assigned application 408. Both the first and second users access their assigned applications using the same URL. In actuality each of these copies or instances of this application are located and accessed through a different URL. These assignments are stored within user database 416 in these examples. An identification of the URL for a particular copy or instance is placed in each entry. Proxy server 412 actually dynamically modifies the access or URL to the one assigned to each user. In other words, proxy server 412 provides an illusion that the user is the only one working on the application.

In this example, proxy server 412 includes a process to identify the user. This process may detect where or what location from which the user is generating a request. Alternatively, the user may access a different host as a starting point, which would then redirect the user to the correct location and to their application instance. With an identification of the user, proxy server 412 will redirect the user to the application assigned to the user, while being careful to keep the URL unchanged as shown in the browser and passed to the application. Proxy server 412 is used since Web server 414 can only interpret a URL in one way. Proxy server 412 functions to change the URL received from users at clients 402 and 404 depending on the identification of the user. This identification may be, for example, based on an IP address of the client or a user name contained within the request along with the URL identifying the application. This identification information located within the request may be compared to entries within user database 416 to identify the appropriate redirection.

At this point, we are ready to pass off the request to a file system or Web application server. Now, the application is modified on the fly to make the application think that it is running as the only application. To accomplish this result, the source code is preprocessed for the application either in batch or dynamically as the application is compiled or interpreted. This can include rewriting URLs as they are passed to and from the application or rewriting URLs in the source code just before compilation or building. These processes are illustrated in more detail in FIGS. 7 and 8 below. The server applications that are serving the application being developed also may be modified to contain many instances of the application with identical settings but different names. In this case, the proxy designates which named instance is to be activated.

Turning now to FIG. 5, a diagram illustrating examples of entries is depicted in accordance with a preferred embodiment of the present invention. Entries 500, 502, and 504 are examples of entries, which may be located in user database 416 in FIG. 4. The proxy server, such as proxy server 412 in FIG. 4, may access these entries to redirect the request to the appropriate instance of an application for a user. The entries are indexed by identifications of the user. Each entry includes a user identification and a URL. This URL points to the application associated within or assigned to the user. Entries 500 and 502 identify a user based on a location, which are IP addresses for these entries. Entry 504 identifies a user based on a user name. Of course, other types of identifications may be used depending on the particular implementation. This example illustrates different types of user identifications with a single user database. All of the entries could be of the same type of identification rather than using different types of identifications as identified in FIG. 5.

Turning next to FIG. 6, a flowchart of a process used for accessing a set of applications using the same universal resource locator (URL) is depicted in accordance with a preferred embodiment of the present invention. The process illustrated in FIG. 6 may be implemented in a proxy server, such as proxy server 412 in FIG. 4.

The process begins by receiving a request from a user (step 600). This request is received from a client, such as client 402 or 404 in FIG. 4. The request contains a URL for an application. Next, the user and URL are identified (step 602). In these examples, the identification of the user may be based on an IP address or a user name contained within the request. The request is then redirected to a URL associated with the user based on the identification of the user (step 604) with the process terminating thereafter. The request may be redirected by identifying another URL for the application assigned to the user. This URL is the URL actually used to make the request to a Web server, such as Web server 414 in FIG. 4.

The proxy server may redirect URLs using two options. One involves preprocessing the source code before compilation and building to incorporate the URL while the other option involves dynamic rewriting of the URL passed back and forth to the application.

With reference next to FIG. 7, a flowchart of a process used for preprocessing source code is depicted in accordance with a preferred embodiment of the present invention. The process illustrated in FIG. 7 may be implemented in a proxy server, such as proxy server 412 in FIG. 4.

The process begins with starting compilation of the source code (step 700). As part of this process, the URLs are rewritten in source code (step 702). Compilation of the source code with the rewritten URLs then occurs (step 704). Next, the source code is restored to its original state for later use (step 706) and the process terminates thereafter.

Turning next to FIG. 8, a flowchart of a process used for rewriting URLs for an application is depicted in accordance with a preferred embodiment of the present invention. The process illustrated in FIG. 8 may be implemented in a proxy server, such as proxy server 412 in FIG. 4.

The process begins by receiving a request from a client, such as one at which a developer is located (step 800). The URLs in the request are mapped to the appropriate application (step 802). The application processes the request and sends a response (step 804). The applications response is mapped to the request URL (step 806). The response is sent back to the requestor (step 808) and the process terminates thereafter.

Thus, the present invention provides an improved method, apparatus, and computer instructions for accessing applications using the same URL. With the above described mechanism, multiple users may access multiple instances of the same application on the same environment, such as the same server or local area network. The mechanism of the present invention dynamically maps or changes the URL to one for the instance associated with or assigned to a particular user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The examples illustrated provide access to difference instances or copies of the same application. The mechanism of the present invention also may be applied to different applications using the same URL based on an identification of the user. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing access to a set of applications associated with a universal resource locator, the method comprising:
   receiving a request for a first application from a second application, wherein the request includes the universal resource locator and a user identification and, wherein every request for applications within the set of applications uses the universal resource locator;
   modifying the universal resource locator based on the user identification, wherein the step of modifying maintains the universal resource locator unchanged as shown in the second application; and
   directing the request to a selected application within the set of applications using the modified universal resource locator.

2. The method of claim 1, wherein the user identification is an Internet Protocol address of a node originating the request.

3. The method of claim 1, wherein the user identification is a user name located within the request.

4. The method of claim 1, further comprising:
   replacing the selected application with a new selected application.

5. The method of claim 1, wherein each application within the set of applications is assigned to a different universal resource locator and wherein the directing step comprises:
   identifying the set of applications using the universal resource locator;
   identifying the selected application based on the user identification; and
   sending the request to the selected application using an assigned universal resource locator assigned to the selected applications.

6. The method of claim 1, wherein directing the request to the selected application within the set of applications using the modified universal resource locator comprises:
   writing the modified universal resource locator in a source code of the selected application to form a modified source code;
   compiling the modified source code of the selected application to form a modified selected application; and
   directing the request to the modified selected application in place of the selected application.

7. A method in a data processing system for managing access to a plurality of applications, the method comprising:
   associating the plurality of applications with a first universal resource locator;
   assigning the plurality of applications with plurality of universal resource locators excluding the first universal resource locator;
   receiving a request for a first application from a second application, wherein the request includes the first universal resource locator and an identification of a user and, wherein every request for applications within the plurality of applications uses the first universal resource locator;
   modifying the first universal resource locator based on the user identification, wherein the step of modifying maintains the first universal resource locator unchanged as shown in the second application; and
   redirecting the request using the modified universal resource locator to a particular application within the plurality of applications.

8. The method of claim 7, wherein the identification is an Internet Protocol address.

9. The method of claim 7, wherein the identification is a user name.

10. A data processing system comprising:
a bus system;
a communications unit connected to the bus system; a memory connected to the bus system, wherein the memory includes a set of instructions; and
a processing unit connected to the bus system, wherein the processing unit executes the set of instructions to receive a request for a first application from a second application in which the request includes a universal resource locator and a user identification and, wherein every request for the first application uses the universal resource locator; modify the universal resource locator based on the user identification, wherein the step of modifying maintains the universal resource locator unchanged as shown in the second application; and direct the request to a selected application within a set of applications using the modified universal resource locator.

11. A data processing system comprising:
a bus system;
a communications unit connected to the bus system;
a memory connected to the bus system, wherein the memory includes a set of instructions; and
a processing unit connected to the bus system, wherein the processing unit executes the set of instructions to associate a plurality of applications with a first universal resource locator; assign the plurality of applications with plurality of universal resource locators excluding the first universal resource locator; receive a request for a first application from a second application, wherein the request includes the first universal resource locator and an identification of a user and, wherein every request for applications within the plurality of applications uses the first universal resource locator; modify the first universal resource locator based on the user identification, wherein the step of modifying maintains the first universal resource locator unchanged as shown in the second application; and redirect the request using the modified universal resource locator to a particular application within the plurality of applications.

12. A data processing system for managing access to a set of applications associated with a universal resource locator, the data processing system comprising:
receiving means for receiving a request for a first application from a second application, wherein the request includes the universal resource locator and a user identification and, wherein every request for applications within the set of applications uses the universal resource locator;
modifying means for modifying the universal resource locator based on the user identification, wherein the step of modifying maintains the universal resource locator unchanged as shown in the second application; and
directing means for directing the request to a selected application within the set of applications using the modified universal resource locator.

13. The data processing system of claim 12, wherein the user identification is an Internet Protocol address of a node originating the request.

14. The data processing system of claim 12, wherein the user identification is a user name located within the request.

15. The data processing system of claim 12 further comprising: replacing means for replacing the selected application with a new selected application.

16. The data processing system of claim 15, wherein the new selected application is a new version of the selected application.

17. The data processing system of claim 12, wherein each application within the set of applications is assigned to a different universal resource locator and wherein the directing means comprises:
first identifying means for identifying the set of applications using the universal resource locator;
second identifying means for identifying the selected application based on the user identification; and
sending means for sending the request to the selected application using an assigned universal resource locator assigned to the selected applications.

18. A data processing system for managing access to a plurality of applications, the data processing system comprising:
associating means for associating the plurality of applications with a first universal resource locator;
assigning means for assigning the plurality of applications with plurality of universal resource locators excluding the first universal resource locator;
receiving means for receiving a request for a first application from a second application, wherein the request includes the first universal resource locator and an identification of a user and, wherein every request for applications within the set of applications uses the universal resource locator;
modifying means for modifying the first universal resource locator based on the user identification, wherein the step of modifying maintains the first universal resource locator unchanged as shown in the second application; and
redirecting means for redirecting the request using the modified universal resource locator to a particular application within the plurality of applications.

19. The data processing system of claim 18, wherein the identification is an Internet Protocol address.

20. The data processing system of claim 18, wherein the identification is a user name.

21. A computer program product in a computer readable recordable-type medium for managing access to a set of applications associated with a universal resource locator, the computer program product comprising:
first instructions for receiving a request for a first application from a second application, wherein the request includes the universal resource locator and a user identification and, wherein every request for applications within the set of applications uses the universal resource locator;
second instructions for modifying the universal resource locator based on the user identification, wherein the step of modifying maintains the universal resource locator unchanged as shown in the second application; and
third instructions for directing the request to a selected application within the set of applications using the modified universal resource locator and the user identification.

22. The computer program product of claim 21, wherein the user identification is an Internet Protocol address of a node originating the request.

23. The computer program product of claim 21, wherein the user identification is a user name located within the request.

24. The computer program product of claim 21 further comprising:
third instructions for replacing the selected application with a new selected application.

25. The computer program product of claim 24, wherein the new selected application is a new version of the selected application.

26. The computer program product of claim 21, wherein each application within the set of applications is assigned to a different universal resource locator and wherein the second instructions comprises:
- first sub-instructions for identifying the set of applications using the universal resource locator;
- second sub-instructions for identifying the selected application based on the user identification; and
- third sub-instructions for sending the request to the selected application using an assigned universal resource locator assigned to the selected applications.

27. A computer program product in a computer readable recordable-type medium for managing access to a plurality of applications, the computer program product comprising:
- first instructions for associating the plurality of applications with a first universal resource locator;
- second instructions for assigning the plurality of applications with plurality of universal resource locators excluding the first universal resource locator;
- third instructions for receiving a request for a first application from a second application, wherein the request includes the first universal resource locator and an identification of a user and, wherein every request for applications within the set of applications uses the universal resource locator:
- fourth instructions for modifying means for modifying the first universal resource locator based on the user identification, wherein the step of modifying maintains the first universal resource locator unchanged as shown in the second application; and
- fifth instructions for redirecting the request using the modified universal resource locator to a particular application within the plurality of applications.

28. The computer program product of claim 27, wherein the identification is an Internet Protocol address.

29. The computer program product of claim 27, wherein the identification is a user name.

* * * * *